July 9, 1946.  R. BIRMANN  2,403,489
BEARING CONSTRUCTION FOR TURBINES OR THE LIKE
Filed Aug. 29, 1941
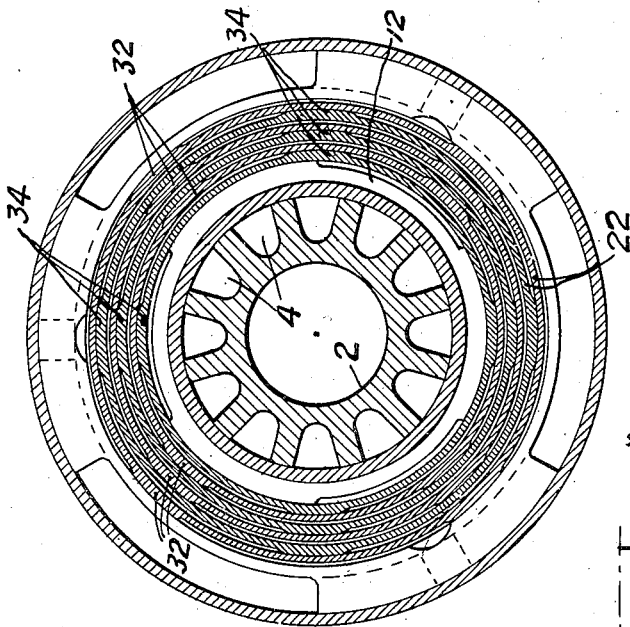
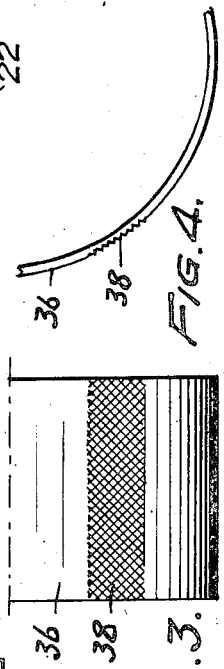
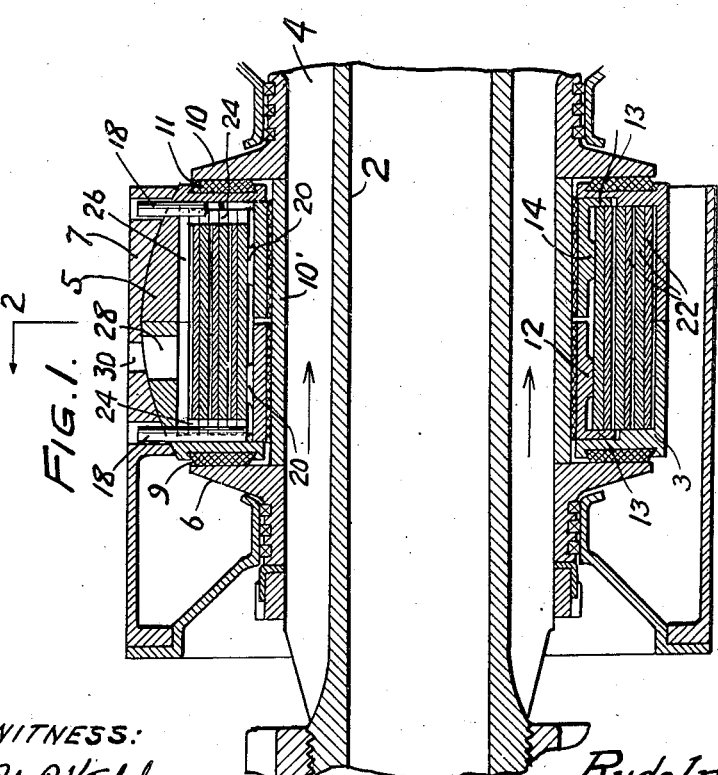
WITNESS:
INVENTOR
Rudolph Birmann
BY
ATTORNEYS.

UNITED STATES PATENT OFFICE 2,403,489

BEARING CONSTRUCTION FOR TURBINES OR THE LIKE

Rudolph Birmann, Newtown, Pa., assignor, by mesne assignments, to Federal Reserve Bank of Philadelphia, a corporation of the United States of America Application August 29, 1941, Serial No. 408,787

7 Claims. (Cl. 308—26)

This invention relates to a bearing construction particularly adapted for turbines or the like permitting operation at or above the critical speed of the turbine shaft and under conditions of high rotor temperature.

In my application No. 372,966, filed January 3, 1941, there is disclosed a bearing construction designed particularly for high speed turbines. Such a bearing construction is provided because the use of stiff shafts is impractical in extremely high speed turbines and flexible shafts must be resorted to. While the critical speed of a stiff shaft lies above its maximum operating range, a flexible shaft has its critical speed below its possible operating speed. A gas turbine, and particularly an exhaust gas turbine for driving a supercharger, may have to be operated at all speeds from zero to the highest permissible speed and may, therefore, operate for substantial periods at the first or at some higher order critical speed.

With conventional bearing constructions, continous operation at a critical speed is dangerous, inasmuch as it is likely to result in the complete destruction of the unit. In the arrangement described in my said application, there is provided a bearing which is resilient in such manner that it permits the shaft to revolve at all times around its true center of gravity and thereby eliminates the reasons for the phenomena arising at critical speed. These phenomena are well known and discussed in texts and need not be gone into here. It is sufficient to state that at a critical speed stresses of dangerous and destructive magnitude are likely to be set up. In accordance with the design disclosed in said prior application, not only is sufficient resiliency or flexibility of the bearing provided, but a substantial damping action as well. The bearing comprises sleeves having tapered spaces between them in which oil films are maintained by capillary action.

While said bearing is very satisfactory for many purposes, it has been found that under some conditions the flexibility which it provides is too great when a sufficient number of sleeves are provided in a given restricted space to effect the necessary degree of damping action by the provision of a sufficient number of oil spaces. In other words, when the sleeves are made of the required thinness, the spring action resulting from the alternate tapering of the sleeves in opposite directions is insufficient to maintain the shaft under sufficient centralizing restraint.

It is the general object of the present invention to provide a bearing arrangement of somewhat similar character, but by which, though adequate damping is provided, stronger forces are applied to the shaft tending to maintain it centralized while at the same time permitting eccentric operation to the extent necessary to avoid the destructive conditions arising at critical speeds. In accordance with the invention, nested sleeves are again provided, but in a form having less resiliency so as to accomplish the result just indicated.

The above and further objects of the invention, particularly relating to details, will be apparent from the following description, read in conjunction with the accompanying drawing, in which:

Figure 1 is a sectional view showing details of the bearing construction;

Figure 2 is a transverse section taken on the plane indicated at 1—1 in Figure 1;

Figure 3 is a fragmentary elevation of a modified form of sleeve which may be used in accordance with the invention; and Figure 4 is a fragmentary elevation of an end of the sleeve of Figure 3.

The bearing is illustrated as of the same general type and in the same association with other parts as the similar bearing in said application Serial No. 372,966, and details of the associated elements of the mechanism need not be described herein. There is indicated at 2 a hollow shaft which is mounted in the bearing and may carry a turbine disc and impeller rotors. For cooling purposes, as described in said application, the exterior of the shaft is fluted as indicated at 4.

The bearing comprises an outer member 7 which is secured within, and in effect forms a part of, the casing of the machine. This member 7 is provided with a plurality of interior spherical faces providing a bearing for similar spherical faces (three in number) provided on elements 3 and 5 constituting, in effect, a single inner member of the bearing but made separate for purposes of assembly. The elements 3 and 5 are provided with bearing rings 9 and 11 adapted to take endwise thrusts of collars 6 and 10 secured to the periphery of the shaft 2 about the grooves 4 and rotating with the shaft. Associated with the thrust collars are arrangements providing closed lubricant chambers, as in the construction of said prior application.

A sleeve 10', also secured to the shaft 2, spaces the collars 6 and 10 and provides on its exterior a bearing surface contacting the babbited inner surfaces of cylindrical members 12 and 14. These latter members are provided with radially extending flanges 13 the edges of which, having slight clearance with annular bores of elements 3 and 5 limit radial displacement of the bearing. These flanges 13 are also provided with openings into which project pins 18, which project also through openings in the member 7 and the respective elements 3 and 5, thereby preventing relative rotations of these various parts. The pins fit the openings in member 7 loosely, however, so as to permit tilting of the shaft and the inner elements of the bearings relative to the member 7.

The members 12 and 14 are provided with circumferentially extending pads 20 supporting internally the bundle of nested sleeves 22 to which further reference will be made hereafter. These sleeves fill the space between the pads 20 and the inner surfaces of the elements 3 and 5. These latter surfaces are provided with oil grooves indicated at 26 communicating with radially extending openings 28 and 30 in element 3 and member 7, respectively. Oil under pressure is furnished to the openings 30 as described in said prior application.

The nature of the sleeves 22 is illustrated to a distorted scale in Figures 1 and 2. Each of the sleeves is provided with a cylindrical inner surface. The sleeves form two groups, which are similar in construction with the exception of angular displacements of longitudinally extending pads, indicated at 32 and 34, respectively, and formed as slight projections from the outer surfaces of the sleeves. While other relative arrangement of the pads may be provided, it will be observed from Figure 2 that each sleeve is provided with four pads arranged at 90° spacings, and when the sleeves are nested, the pads of adjacent sleeves are located 45° from each other, providing a staggered arrangement. The maintenance of these positions is effected by providing notches 24 in the edges of the sleeves embracing the pins 18, thus preventing relative rotation thereof and also maintaining the nested groups stationary within the outer portions of the bearings. The pads which have been described are raised several thousandths of an inch, for example .005 inch, above the adjacent cylindrical portions of their respective sleeves, with the result that there are provided oil receiving spacings several thousandths of an inch thick between each pair of sleeves. By reason of the staggered arrangement of the pads, it will be evident that each pad is subjected to pressure tending to force it outwardly and will apply such pressure at a point intermediate the pads on the next outer sleeve, with the result that flexure to some extent may occur, reducing the size of the oil receiving space on the outside of the last mentioned sleeve. The pressure thus exerted, furthermore, will be applied through the adjacent pads of the last mentioned sleeve to flex the next outer sleeve, and so on. Thus any pressure exerted by the shaft during rotation, in its tendency to rotate about an axis eccentric to its geometrical one, will be taken up by the flexures of the various sleeves between their pad portions with alternate reduction and enlargement of the oil spaces, as the shaft revolves, to effect a damping action. As compared with the arrangement described in my prior application, a somewhat greater restraint is exerted by the bearing to cause the shaft to rotate about its geometrical axis and to maintain its geometrical axis in alignment with the structural axis of the bearing. On the other hand, well below its critical speed it will revolve about its true center of gravity, with the result that the phenomena resulting from reaching of critical speed will not appear. Substantial resiliency is thus provided with a high degree of damping, so that there are no tendencies toward the building up of vibrations. The oil in the films between the sleeves is caused to flow continuously inwardly and outwardly, as deflections of the sleeve occur, but with the reduced resiliency provided by the construction, it is substantially impossible for the oil to be forced completely out of the space between the sleeves to destroy the damping action. While in the specific modification of the invention illustrated a thrust bearing is shown, it will be obvious that the invention is equally applicable to a plain journal. The necessity for the provision of a spherical mounting may not always arise, since the sleeves provide by their resiliency a substantial capability of universal movement, involving a substantial freedom for tilting.

The longitudinally extending pads on the sleeves may be readily provided by turning the sleeves on a lathe with the provision of cam means for slightly displacing the tool outwardly periodically for the formation of the pads. However, quite effective pads may be provided in other ways. For example, as illustrated in the modification of Figures 3 and 4, in which there is illustrated a sleeve adapted to be associated in staggered relationship with others in which the exteriorly projecting pad is provided by knurling, as indicated at 38, which will effect an extruding of metal points or projections outwardly to the extent of the necessary few thousandths of an inch clearance between the sleeves. Uniform projection may then be secured by grinding.

The pads may also be built up by metallic (e. g., chromium) plating, or by etching away with acid portions of the sleeves leaving the pads.

While longitudinally extending pads have been primarily mentioned, the localized areas of contact may be provided by pads arranged otherwise, since the same resiliency conditions will be achieved in general if local pads are provided which are in staggered relationship to each other on adjacent rings. It will be evident, in fact, that a similar action may also be obtained if certain of the sleeves are provided with pads on both their inner and outer surfaces and intermediate pads are provided with cylindrical inner and outer surfaces.

What I claim and desire to protect by Letters Patent is:

1. In combination, a high speed shaft, a casing, a bundle of nested sleeves mounted in the casing and mounting said shaft, adjacent surfaces of sleeves of said bundle having localized regions of contact with each other and being separated between such regions of contact to provide capillary oil spaces, the regions of contact of the inner and outer surfaces of each sleeve being substantially out of radial alignment, so that relative flexures of adjacent sleeves modifying the thickness of said capillary oil spaces may occur between their regions of contact with each other due to pressures exerted at the regions of contact on their non-adjacent surfaces and means for supplying oil to said capillary spaces.

2. In combination, a high speed shaft, a casing, a bundle of nested sleeves mounted in the casing and mounting said shaft, adjacent surfaces of sleeves of said bundle having localized axially extending regions of contact with each other and being separated between such regions of contact to provide capillary oil spaces, the regions of contact of the inner and outer surfaces of each sleeve being substantially out of radial alignment, so that relative flexures of adjacent sleeves modifying the thickness of said capillary oil spaces may occur between their regions of contact with each other due to pressures exerted at the regions of contact on their non-adjacent surfaces and means for supplying oil to said capillary spaces.

3. In combination, a high speed shaft, a casing, a bundle of nested sleeves mounted in the casing and mounting said shaft, said sleeves having outer surfaces provided with localized pads arranged to engage the inner surfaces of the respective adjacent outer sleeves to provide capillary oil spaces between the pads, the pads of adjacent sleeves being substantially out of radial alignment, so that relative flexures of adjacent sleeves may occur between the pads of the inner one of the adjacent pair due to pressures exerted at the pads of the outer one of the pair to modify the thickness of said capillary oil spaces, and means for supplying oil to said capillary spaces.

4. In combination, a high speed shaft, a casing, a bundle of nested sleeves mounted in the casing and mounting said shaft, said sleeves having outer surfaces provided with localized axially extending pads arranged to engage the inner surfaces of the respective adjacent outer sleeves to provide capillary oil spaces between the pads, the pads of adjacent sleeves being substantially out of radial alignment, so that relative flexures of adjacent sleeves may occur between the pads of the inner one of the adjacent pair due to pressures exerted at the pads of the outer one of the pair to modify the thickness of said capillary oil spaces, and means for supplying oil to said capillary spaces.

5. In combination, a high speed shaft, a casing, a bundle of nested sleeves mounted in said casing and mounting said shaft, adjacent surfaces of sleeves of said bundle having localized regions of contact with each other and being separated between such regions of contact to provide capillary oil spaces, the regions of contact of the inner and outer surfaces of each sleeve being substantially out of radial alignment, so that relative flexures of adjacent sleeves modifying the thickness of said capillary oil spaces may occur between their regions of contact with each other due to pressures exerted at the regions of contact on their non-adjacent surfaces, means for supplying oil to said capillary spaces, and means for limiting the total flexures of said sleeves.

6. In combination, a high speed shaft, a casing, a bundle of nested sleeves mounted in said casing and mounting said shaft, adjacent surfaces of sleeves of said bundle having localized regions of contact with each other and being separated between such regions of contact to provide capillary oil spaces, the regions of contact of the inner and outer surfaces of each sleeve being substantially out of radial alignment, so that relative flexures of adjacent sleeves modifying the thickness of said capillary oil spaces may occur between their regions of contact with each other due to pressures exerted at the regions of contact on their non-adjacent surfaces, means for supplying oil to said capillary spaces, and means mounting said sleeves for simultaneous tilting movements of said sleeves about axes perpendicular to the axis of the shaft.

7. In combination, a high speed shaft, a casing, a bundle of nested sleeves mounted in said casing and mounting said shaft, adjacent surfaces of sleeves of said bundle having localized regions of contact with each other and being separated between such regions of contact to provide capillary oil spaces, the regions of contact of the inner and outer surfaces of each sleeve being substantially out of radial alignment, so that relative flexures of adjacent sleeves modifying the thickness of said capillary oil spaces may occur between their regions of contact with each other due to pressures exerted at the regions of contact on their non-adjacent surfaces, and means for supplying oil to said capillary spaces, said means including elements providing an oil receiving chamber embracing the ends of said sleeves and communicating freely with said capillary oil spaces.

RUDOLPH BIRMANN.